March 23, 1943. W. E. URSCHEL 2,314,468
MOLDING AND DEPOSITING MACHINE FOR SOLIDIFIABLE PLASTIC MATERIALS
Filed Aug. 1, 1940 2 Sheets-Sheet 1
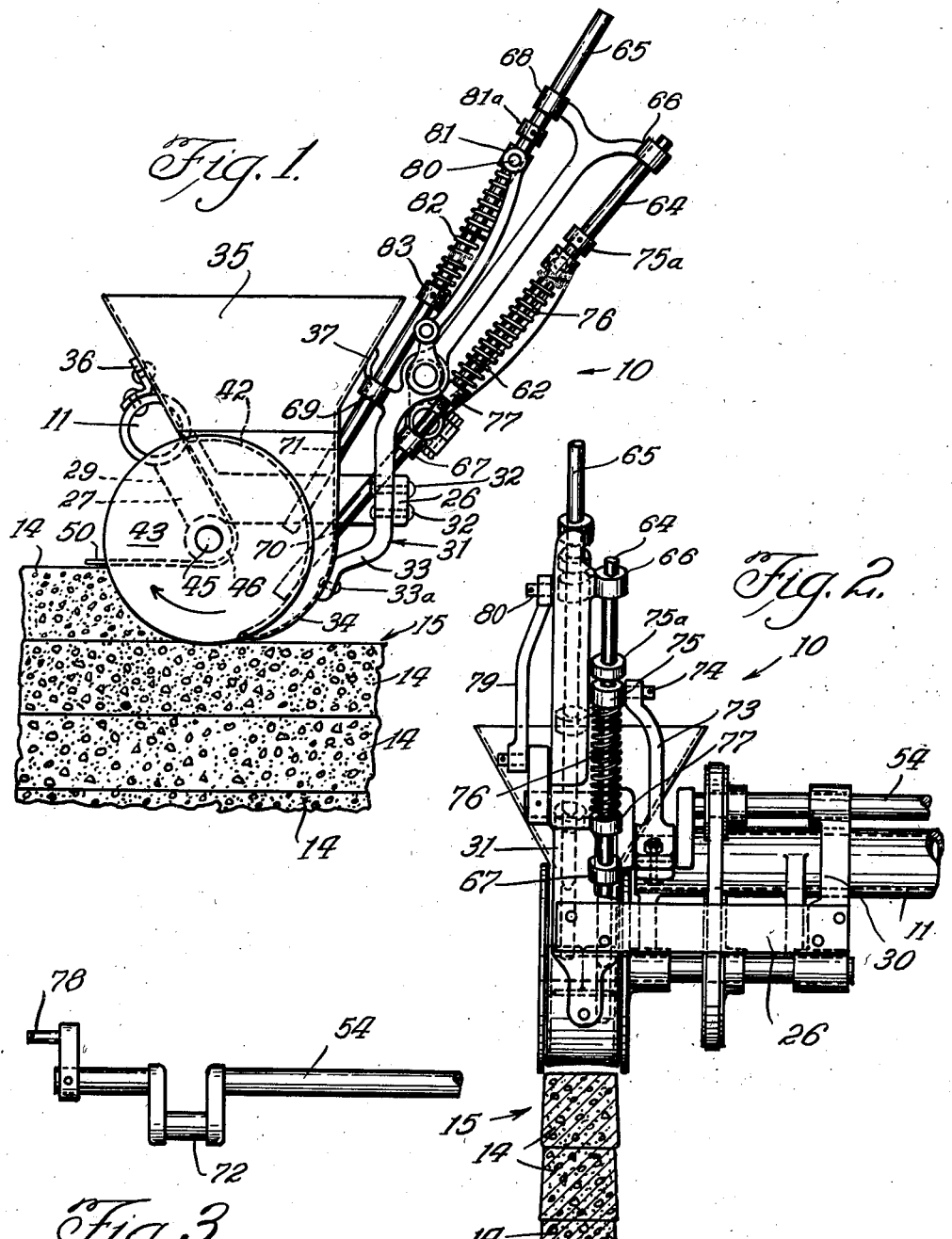
INVENTOR.
William E. Urschel
BY
ATTORNEY.

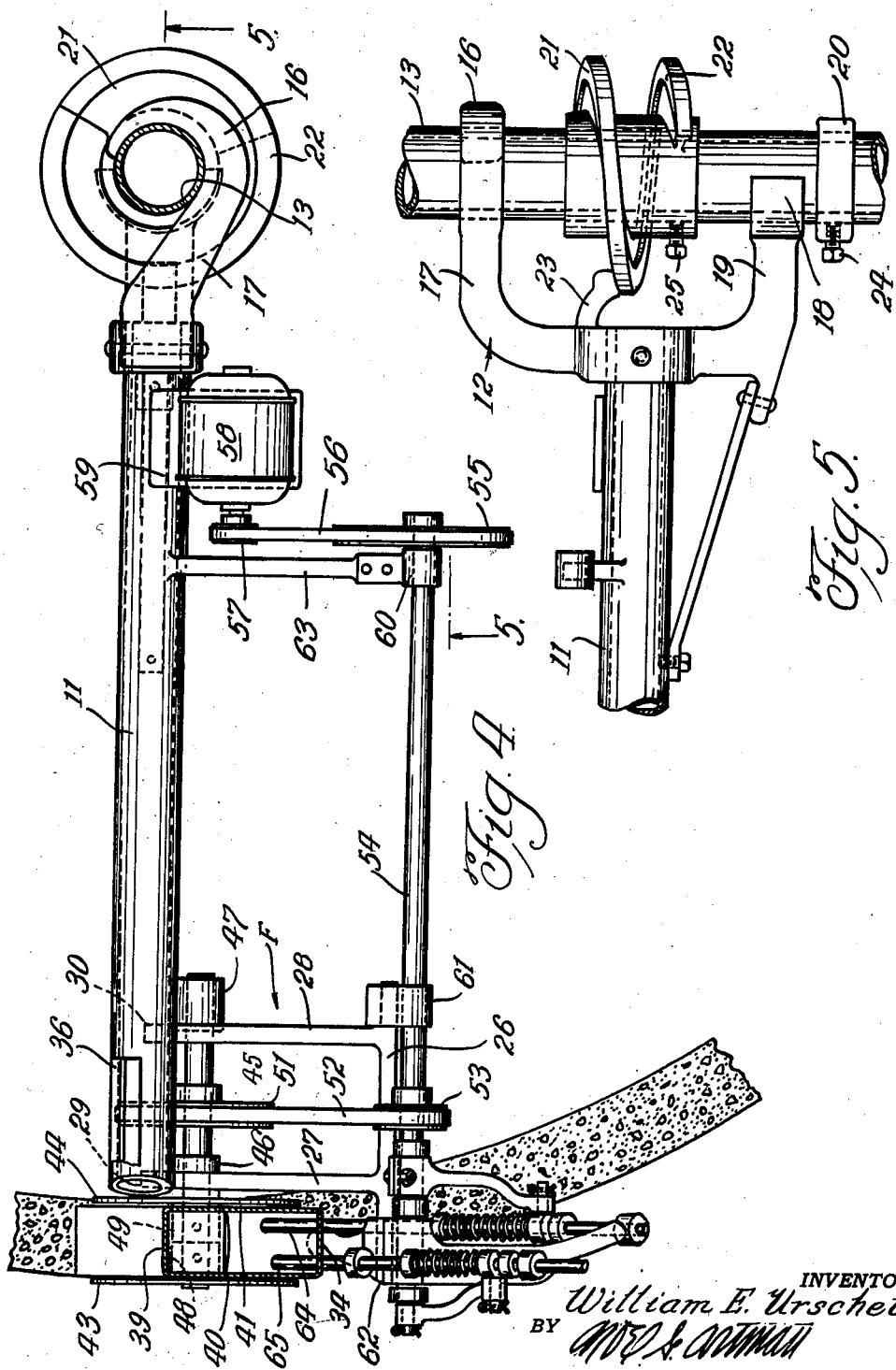

Patented Mar. 23, 1943

2,314,468

UNITED STATES PATENT OFFICE 2,314,468

MOLDING AND DEPOSITING MACHINE FOR SOLIDIFIABLE PLASTIC MATERIALS

William E. Urschel, Valparaiso, Ind.

Application August 1, 1940, Serial No. 349,309

21 Claims. (Cl. 25—41)

This invention has to do with molding machines and relates more particularly to such a machine of the extrusion type for forming a wall or the like of superposed sections of an extruded solidifiable plastic strip or strips.

The general object of the present invention is the provision of a new machine for shaping, laying and troweling a continuous strip of solidifiable plastic material, and while the embodiment herein disclosed is exemplified by the manner it may be used for handling concrete made of Portland cement there is no intention of limiting the scope of the invention to machines for operating upon any particular plastic substance.

More specific objects include the provision of a machine comprising a molding head and carriage means for transporting such head without imposing weight upon a wall being formed; a new molding head in which a novel tamping means is employed for packing the material being molded into a molding discharge passage and for extruding such material from such passage; a molding head including mechanically actuated trowel means; a molding head including trowel means which is mechanically drawn in such a manner as to assist in feeding the material being molded through such discharge passage; and the provision of a molding machine comprising a molding head through which molded material is extruded and means for transporting such molding head in a spiral path.

The above and other desirable objects of this invention will become apparent upon reading the following description with reference to the annexed two sheets of drawings, wherein:

Fig. 1 is an end elevation of a molding head constituting a part of the herein described machine which is constructed in accordance with the principles of the present invention;

Fig. 2 is a side elevation of the molding head shown in Fig. 1;

Fig. 3 is a fragmentary side elevational view of a crankshaft employed for driving tamping members included in the structure of the aforesaid molding head;

Fig. 4 is a plan view of the entire machine; and

Fig. 5 is a fragmentary side elevational view taken substantially on the line 5—5 of Fig. 4.

Referring now to the drawings wherein the same reference characters that appear in several figures designate the same respective parts, and particularly to Figs. 1, 2, 4 and 5, the machine will be seen to include a molding head generally designated 10 which is supported at the outer end of a boom 11 (carriage means) and which boom is pivotally connected at its inner end by means of a bearing bracket 12 with a vertical standard 13. Thus in the illustrated embodiment of the invention the molding head 10 is constrained for movement in a circular path about the standard 13 for molding and depositing successive vertical layers or courses 14 of a solidifiable plastic material such as Portland cement for effecting a cylindrical wall 15.

In Figs. 4 and 5 the bracket 12 is shown as having a hook-like bearing 16 at the end of an upper leg 17 and a semicircular thrust bearing 18 at the end of a lower leg 19. These bearings 16 and 18 serve to support the boom 11 horizontally while bearing against diametrically opposite sections of the standard 13 and they further facilitate assembly and disassembly with the standard while the outer end of the boom is elevated. Displacement of the boom 11 downwardly of the standard 13 is prevented either by means of a collar 20 disposed against the lower end of the bearing 18 or a spiral cam member 21 placed with its camming surface 22 against a cam follower 23 which is fixed to the bracket 12. Set screws 24 and 25 are respectively associated with the collar 20 and the cam member 21 for engaging the standard 13 and thus maintaining these members 20 and 21 in selected vertical positions. When it is desired to discharge a horizontal course of plastic material from the molding head 10 the collar 20 will be placed against the lower end of the bearing 18 and the set screw 24 tightened for maintaining the boom 11 and the molding head 10 in a true horizontal path while they are revolved about the standard 13. Meanwhile the set screw 25 will have been loosened and the cam member 21 moved out of association with the cam follower 23.

The boom 11 can be operated for carrying the molding head in a vertical spiral for forming a wall of spirally arranged strips 14 by use of the cam member 21 in conjunction with the collar 20. At the beginning of the laying of a spiral layer or course by use of the head 10, the bracket 12 will be selectively placed vertically upon the standard 13 and the cam member 21 will be positioned with the lower end of the camming face 22 beneath and in abutting relation with the cam follower 23 whereupon the set screw 25 is tightened. During the ensuing operation of the machine the boom 11 and the head 10 will be moved circumferentially about the standard 13 while being elevated by the cam follower 23 as it rides upwardly along the face 22. When the cam follower 23 approaches the upper end of the face 22, movement of the boom 11 will cease and the collar 20 will be moved upwardly into abutting relation with the lower end of the bracket 12 and the set screw 24 tightened for maintaining said boom in the elevated position until such time as the set screw 25 can be loosened and the cam 21 readjusted for again placing the lower end of the camming surface 22 in cooperating relation with the cam follower 23. Thereafter when the set screw 25 is again tightened the cycle of rotating the boom 11 and the molding head 10 circumferentially and spirally about the standard 13 may be repeated.

The molding head at the outer end of the boom 11 comprises a frame F which includes a side bar 26 extending in parallelism with the boom 11 and a pair of transverse members 27 and 28 which are substantially L-shaped as is illustrated in Fig. 1 where the principal portion of the frame member 27 is shown in dotted outline. The upwardly extending legs 29 and 30 of the transverse members 27 and 28 are suitably attached with the boom 11. An elongated upwardly and forwardly extending frame member 31, Figs. 1 and 2, is connected with the outer end section of the horizontal frame member 26 by any standard means such as rivets 32, and the lower end of this frame member 31 is curved at 33 for seating the outer periphery of the backwardly curved lower section upon the wall 34 of a hopper 35. A rivet 33a is employed for connecting the hopper wall 34 with the frame member 31. Said hopper 35 is further supported by means of a bracket 36 which has one end connected with the boom 11, as shown in Figs. 1 and 4, and by means of an extension 37 which is integral with a bearing 69 upon the frame member 31.

As will be seen in Fig. 4 the lower and discharge end of the hopper 35 comprises the aforesaid front wall 34, a back wall 39, an outer wall 40 and an inner wall 41. The wall 40 is cut away along a circular edge 42 as illustrated in Fig. 1 and the wall 41 is cut away in a similar fashion. These cut-away sections of the inner and outer walls 40 and 41 are covered by rotatable disk-like trowel members 43 and 44. Said trowel members are rotatively fixed upon a common shaft 45 which is journalled in bearings 46 and 47 depending from the undersides of the frame members 27 and 28. The lower end of the front wall 39 is curved about and backwardly from the hubs 48 and 49 of the rotatable trowels 43 and 44 to effect a horizontal sliding trowel member 50. Thus it will be seen that the lower portions of the walls 40 and 41 together with the opposed inner peripheral sections of the rotatable trowels 43 and 44, the backwardly curved section of the wall 34 and the trowel member 50 effect a backwardly curved and horizontally directed discharge passage for the hopper 35, this passage being rectangular in cross section.

The trowel members 43 and 44 and the shaft 45 upon which they are carried are rotated by means of a power train including a pulley 51 fixed to the shaft 45, a belt 52, a pulley 53 fixed to a crankshaft 54, a pulley 55 also fixed to the shaft 54, a belt 56 and a pulley 57 which is mounted upon the drive shaft of an electric motor 58. This motor 58 is suitably attached to an anchor plate 59 mounted upon and near the inner end of the boom 11. Journals for the shaft 54 are designated 60, 61 and 62 and are carried respectively upon a transverse bracket 63 and upon the frame members 26 and 31.

Rotation of the motor 58 is such as to drive the trowel members 43 and 44 in the direction indicated by the arrow in Fig. 1. Hence the sections of the opposed peripheral faces of said trowel members which successively traverse the outer and inner walls of the discharge passage do so in a direction which, because of their friction engagement of the material discharged through the passage, enables them to function as feeder members for expediting such discharge.

Discharge of the material through such passage is also aided by a pair of tamping members 64 and 65 which are reciprocally carried in bearings provided upon the frame member 31. The rod 64 is reciprocal in bearings 66 and 67 whereas the rod or tamping member 65 is reciprocal in bearings 68 and 69. These tamping rods 64 and 65 project into the hopper discharge passage through openings 70 and 71 in the front wall 34 of such passage and are driven from the motor 58 through the crankshaft 54. A crank bearing 72, Fig. 3, has the lower end of a connecting rod 73 journalled thereon whereas the upper end of this connecting rod is pivotally connected with a bearing stud 74 which projects outwardly from a collar 75 which is slidable upon the tamping rod 64. During rotation of the crankshaft 54 and the consequent revolving motion of the crank bearing 72, the connecting rod 73 will cause reciprocal movement of the collar 75 so that upon downward movement of said collar it will compress a spring 76 which by reacting against a collar 77 that is fixed to the rod 64 will cause downward movement of the rod. Should the lower end of the downwardly driven rod encounter an unyieldable obstruction in the discharge passage, the spring 76 will yield sufficiently to protect the machine against breakage. Return movement of the rod 64 upwardly is effected by the collar pressing against a collar 75a which is fixed to said rod. The field of reciprocation of the rod 64 may be regulated by adjusting the collar 77 axially of the rod and in this way the amount of tamping may be controlled.

A driving connection for the tamping rod 65, similar to that for the rod 64, includes a crank bearing 78 on the crankshaft 54, a connecting rod 79, a bearing stud 80 on a collar 81 which is axially reciprocal upon the rod 65, a compressible spring 82 and a collar 83 fixed selectively axially of the rod. A collar 81a, fixed upon the rod 65, corresponds to the collar 75a upon the rod 64.

An examination of Figs. 1, 2 and 3 will show that the crank bearings 72 and 78 are spaced 180 degrees circumferentially of the crankshaft 54 wherefore the tamping rods 64 and 65 are alternately operated for stuffing or feeding material downwardly and outwardly through the discharge passage.

*Operation of the machine*

Assuming that the machine is to be used in laying helical layers or courses in the formation of a wall, subsequent to the mounting of the post or standard 13 in the center of the space to be occupied by the wall, the bracket 12 will be adjusted vertically upon this standard until the lower edges of the trowel members 43 and 44 are touching or are in close association with the footing for supporting the wall and the cam member 21 will be set with a section of the face 22 adjacent to its lower end in engagement with the cam follower 23. The hopper 35 is then filled with the concrete or other plastic material and the motor started. Concurrently with the starting of the motor the trowels 43 and 44 will rotate as above explained and the tamping members 64 and 65 will be reciprocated to impart a stuffing action to their lower ends within the front of the discharge passage.

An attendant may control the speed at which the molding head advances by either pushing or pulling upon the boom 11. It should be noted, however, that the machine is self-propelling so long as there is moldable material in the hopper or vertical passage leg to be stuffed into the horizontal molding and discharge passage by the tampers, for the molded strip within such passage is reacted upon by the tampers to advance the molding head when there is material to be packed thereby against previously molded material. Holding back on the boom causes the material to be packed more tightly in the molding and discharge passage by the tampers, while pushing forwardly upon the boom would result in the material being packed less tightly. Ordinarily the shearing and compressing force exerted by the front curved portion of the trowel member 50 upon the moldable material adjacently thereto at the junction of the vertical and horizontal passage legs provides sufficient retarding force to cause the tampers to pack the moldable material to the desired degree of compactness as the molding head advances without influence of auxiliary or manual controlling force. That is, in the normal operation of the machine the material packed within and extruded from the horizontal leg of the discharge passage completely fills the same and is pressed upon by the lower surface of the sliding trowel member 50.

Should the moldable material in the hopper and vertical passage leg become depleted the head will simply come to a stop, meanwhile running the tampers and troweling disks idly without incurring any ill effects, so that upon replenishing the hopper with moldable material the tampers will automatically add onto the molded strip while causing the molding head to continue advancing. This automatic feature of the machine adapting it to have moldable material fed to it intermittently makes it especially convenient to be operated by a single attendant who may also prepare the moldable material.

The consistency of the concrete will be such that it will have very little slump after it is laid in place so that it will maintain substantially the contour into which it is molded by the sliding trowel 50 and the rotating trowels 43 and 44. Since the trowels 43 and 44 actually form a part of the discharge passage and move downwardly in the vertical part of the passage they augment the tamping and stuffing action of the tamping rods 64 and 65 in forcing the material into and through the passage. Upward movement of the periphery sections of the rotatable members 43 and 44 immediately after passing the lowermost point in their circular paths assist in packing material against the under face of the sliding trowel 50.

Rotation of the members 43 and 44 is in excess of the speed at which the molding head is advanced so that the opposed faces of these members effect a troweling action upon the inner and outer sides of the extruded strip whereby these surfaces are made smooth and the moisture is worked to the surface and the consistency of the strip is increased.

After a complete revolution has been made with the molding head the collar 20 upon the standard 13 will be brought into association with the lower end of the bracket 12 for supporting this bracket and the molding head in the elevated position while the cam member 21 is adjusted, in the manner hereinabove described, preparatory to laying a succeeding layer or course of the concrete.

While the molding head has been described in association with a machine for forming a cylindrical wall, obviously straight walls or walls of any contour may be formed by associating this molding head with a suitable carriage means for transporting it in a straight line or in a line of other selected configuration. Many other changes may also be made without departing from the principles upon which the present invention is founded.

I claim:

1. In a strip molding and laying head, a discharge passage comprising opposed plane-like molding side walls, and rotatable trowel members of which one has peripheral sections for forming at least a portion of one of said walls and of which members another has peripheral sections for forming at least a portion of the other of said opposed walls, and the peripheral sections of said trowel members being disposed for successively traversing their respective walls within the planes thereof pursuant to rotation of said members.

2. In a molding head, an L-shaped discharge passage, a pair of rotatable members each having a troweling surface, said members being disposed with said faces in opposed relation and with a portion of the face of one forming a lateral side wall section of said passage common to each leg thereof and with a portion of the face of the other face forming the opposed side wall section of said passage, bearing means supporting said members for rotation about an axis normal to said faces and extending through the space embraced by said legs, and means for rotating said members about such axis to successively carry sections of said faces along one of said legs toward the leg junction and along the other of said legs away from such junction.

3. In a molding head, a hopper, a discharge passage having a vertical leg leading downwardly from said hopper and a horizontal leg joining the vertical leg at its lower end, a pair of rotatable members each having a troweling surface, said members being disposed with said faces in opposed relation and with a portion of the face of one forming a lateral side wall section of said passage common to each leg thereof and with a portion of the face of the other face forming the opposed side wall section of said passage, bearing means supporting said members for rotation about an axis normal to said faces and extending through the space embraced by said legs, and means for rotating said members about such axis to successively carry sections of said faces downwardly of the vertical leg and along the other of said legs away from the leg junction.

4. In an apparatus for depositing a strip of solidifiable plastic material along a course, a molding head comprising a discharge passage in which the material is formed into such strip, said head being advanceable along said course axially of said passage which has an end discharge opening facing oppositely to the direction of such advance of the head and through which the strip issues pursuant to such advance thereof, said passage comprising opposed upright side walls for disposition in parallelism with said course and having, between the lower edges of said walls, an open underside through which the strip material is deposited upon said course, said side walls being adapted, when adjacent to said course for deposit of a strip thereon, to coact with said course in forming said end discharge opening, and one of said side walls including trowel means disposed for contiguity with the strip material deposited on said course, as aforesaid and actuatable to trowel the portion of said strip contiguous therewith.

5. The combination set forth in claim 4 and wherein there is carriage means for supporting said head while it is advanced along said course, and means for regulating the elevation of said carriage means and hence of said head to cause the lower edges of said side walls to occupy a position adjacently to the course while the head is advanced.

6. In a machine for constructing a wall from moldable material, head carrier means, and a strip molding and laying head upon said carrier means for direction thereby through a predetermined course, said head comprising a discharge passage including molding side walls for endwise discharge of such material in strip form while the head is directed through said course, and a rotatable trowel member having surface sections displaced radially from its rotational center for forming a portion of one of said walls and for successively traversing said wall within the plane thereof pursuant to rotation of said member.

7. In a machine for constructing a wall from moldable material, head carrier means, and a strip molding and laying head upon said carrier means for direction thereby through a predetermined course, said head comprising a discharge passage including molding side walls for endwise discharge of such material in strip form while the head is directed through said course, a trowel member having a surface section forming a portion of one of said walls, and means for operating said trowel member to impart agitative movement to said section thereof within the plane of said wall during the discharge of said material.

8. In a machine for constructing a wall from moldable material, head carrier means, and a strip molding and laying head upon said carrier means for direction thereby through a predetermined course, said head comprising a discharge passage including molding side walls for endwise discharge of such material in strip form while the head is directed through said course, and a trowel member having a substantially flat surface of which at least a part forms at least a portion of one of said walls, and said trowel member being journalled for rotation about an axis generally normal to said surface to facilitate the troweling thereby of a face of said strip contiguous therewith during discharge of said strip.

9. In a machine for molding and discharging moldable material in strip form, head carrier means, and a strip molding and laying head upon said carrier means for direction thereby through a desired course, said head comprising a discharge passage including molding side walls from between which said material is discharged in strip form while the head is directed through said course, a rotatable feeder member having surface sections for forming at least a portion of one of said walls, said member being rotatable in a direction to successively advance said surface sections along said wall in the direction of discharge, and means for rotating said member.

10. In a machine for molding and discharging moldable material in strip form, head carrier means, and a strip molding and laying head upon said carrier means for direction thereby through a desired course, said head comprising a discharge passage including molding side walls from between which said material is discharged in strip form while the head is directed through said course, a pair of rotatable feeder members each having a smooth troweling face facing axially thereof, said members being disposed with said faces in opposed relation and with portions of each face respectively forming parts of opposite of said passage side walls, and means for rotating said members in the direction to displace said troweling face portions in the direction of discharge through said passage.

11. In a machine for molding and discharging moldable material in strip form, a discharge passage having opposite side walls, an intermediate side wall and an open side wall opposite to the intermediate wall and through which passage such material is axially advanceable to be molded thereby into a strip of predetermined cross sectional contour, means for advancing the material through said passage, a trowel member forming the intermediate passage wall, rotatable trowel members forming said opposite walls, and means for rotating said rotatable trowel members during the advance of said material to effect troweling of opposite sides of said strip.

12. In a machine for constructing a wall from moldable material, a horizontally disposed strip molding and laying passage having opposite generally vertical side walls and an open under side between the lower edges of said walls, means for axially directing said passage along a desired generally horizontal course, trowel disks rotatable about horizontal axes normal to said passage side walls and out of vertical registry therewith, said disks having opposed troweling face portions respectively within the planes of and forming parts of said side walls, and means for rotating said trowel disks for displacing said opposed face portions axially of the passage to trowel faces of a strip of said material confined therebetween.

13. In a machine for constructing a wall from moldable material, a horizontally disposed strip molding and laying passage having opposite generally vertical side walls, an upper horizontal wall between said side walls and an open under side opposite to said horizontal wall, means for axially directing said passage along a desired generally horizontal course, a trowel member in said horizontal wall and having a trowel face presented inwardly of the passage for acting upon a face of a strip confined therein, trowel disks rotatable about horizontal axes normal to the passage side walls and out of vertical registry therewith, said disks having opposed troweling face portions respectively within the planes of and forming parts of said side walls, and means for rotating said disks in the direction to advance said troweling face portions thereof axially of the passage in the direction opposite to that in which said passage is directed by said axially directing means.

14. In a machine for constructing a wall from moldable material, an L-shaped molding and discharge passage having vertical and horizontal legs of which the vertical leg extends downwardly into communication with the horizontal leg at a junction of such legs, means for directing said passage along a predetermined course generally axially of said horizontal leg and in the direction causing the free end of such leg to be the trailing end thereof, elongated tamping members projecting downwardly through the vertical leg substantially into the leg junction and axially reciprocal to advance such material downwardly through the vertical leg and axially of the horizontal leg toward its trailing end, means for reciprocating said tamping members, rotatable trowel members journalled for rotation about a horizontal axis above the horizontal passage leg, lower parts of said trowel members being disposed for forming respective opposed vertical wall portions of the horizontal passage leg, and means for rotating said trowel members in the direction to displace said lower parts thereof toward the trailing end of said leg during operation of said tamping members.

15. In a machine for molding moldable material, directing means, a molding and discharge passage having an open discharge end and connected with said directing means for axial guidance thereby through a desired course, material displacing means connected with said passage and actuatable for displacing moldable material through said passage axially toward the discharge end and outwardly therethrough to react against the discharge of such material for propelling said passage along said course in the direction that the passage discharge end trails, said passage having molding side walls for shaping the material displaced therethrough, trowel means constituting a portion of said walls and actuatable to smooth the surface of the material confined therebetween and means for concurrently actuating said material displacing means and said trowel means.

16. In a machine for forming and depositing a wall course strip of moldable material upon a surface of a supporting medium therefor, directing means, a molding and discharge passage connected with said directing means for axial guidance thereby through a desired course along said surface, said passage comprising opposite side walls for disposition generally normally to said surface and with edges thereof adjacently to said surface and an intermediate side wall between said opposite side walls in opposed spaced relation with said surface, said passage having, opposite to said intermediate wall, an open side through which moldable material in said passage is depositable onto said supporting surface, said passage also having an open discharge end, material displacing means connected with said passage and actuatable for displacing moldable material axially into said passage and through the open side thereof onto said supporting surface and for reacting upon the thus displaced material for propelling said passage axially along said course while discharging the deposited material outwardly through said end opening, trowel means constituting a portion of said side walls and actuatable to smooth the surface of the material confined therebetween, and means for concurrently actuating said material displacing means and said trowel means.

17. In a machine for constructing a wall from moldable material, directing means, a discharge passage for such material upon said directing means for guidance thereby through a desired course and comprising molding side walls for molding such material into a strip of predetermined transverse section as it is advanced axially therethrough, means for advancing said material axially within said passage, trowel means constituting a portion of said walls and agitatable within the plane of the associated of said walls to effect troweling of the surface of the moldable material contiguous therewith in the passage, and means for concurrently operating said material advancing means and said trowel means.

18. In a machine for constructing a wall from moldable material, head carrier means, and a strip molding and laying head upon said carrier means for direction thereby through a predetermined course, said head comprising a discharge passage including molding side walls, tamping members reciprocal in said passage for packing the moldable material between said side walls and forcing the same from between said walls in the form of an axially discharged strip, means for reciprocating said tamping members as the head is directed through said course, a trowel member having a surface section forming a portion of one of said walls, and means for operating said trowel member to impart agitative movement to said section thereof within the plane of said wall during the discharge of said material.

19. In a machine for constructing a wall from moldable material, head carrier means, and a strip molding and laying head upon said carrier means for direction thereby through a predetermined course, said head comprising a discharge passage including molding side walls, tamping members reciprocal in said passage for packing the moldable material between said side walls and forcing the same from between said walls in the form of an axially discharged strip, means for reciprocating said tamping members as the head is directed through said course, and a trowel member having a substantially flat surface of which at least a part forms at least a portion of one of said walls, and said trowel member being journalled for rotation about an axis generally normal to said surface to facilitate the troweling thereby of a face of said strip contiguous therewith during discharge of said strip.

20. In a machine for molding and discharging moldable material in strip form, head carrier means, and a strip molding and laying head upon said carrier means for direction thereby through a desired course, said head comprising a discharge passage including molding side walls, packing means actuatable to pack the moldable material between said molding side walls while urging the packed material from between said walls in the form of an axially discharged strip, means for actuating said packing means, a rotatable feeder member having surface sections for forming at least a portion of one of said walls, said member being rotatable in a direction to successively advance said surface sections along said wall in the direction of discharge, and means for rotating said member.

21. In a machine for molding and discharging moldable material in strip form, head carrier means, and a strip molding and laying head upon said carrier means for direction thereby through a desired course, said head comprising a discharge passage including molding side walls, packing means actuatable to pack the moldable material between said molding side walls while urging the packed material from between said walls in the form of an axially discharged strip, means for actuating said packing means, a pair of rotatable feeder members each having a smooth troweling face facing axially thereof, said members being disposed with said faces in opposed relation and with portions of each face respectively forming parts of opposite of said passage side walls, and means for rotating said members in the direction to displace said troweling face portions in the direction of discharge through said passage.

WILLIAM E. URSCHEL.